(12) United States Patent
Souryavongsa et al.

(10) Patent No.: US 11,377,973 B2
(45) Date of Patent: Jul. 5, 2022

(54) SEALING ARRANGEMENT BETWEEN TWO RING-SHAPED WALLS OF AN AIRCRAFT ENGINE

(71) Applicant: SAFRAN AIRCRAFT ENGINES, Paris (FR)

(72) Inventors: Eddy Keomorakott Souryavongsa, Moissy-Cramayel (FR); Thomas Alain De Gaillard, Moissy-Cramayel (FR); Teddy Fixy, Moissy-Cramayel (FR); Gilles Pierre-Marie Notarianni, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/059,147

(22) PCT Filed: May 16, 2019

(86) PCT No.: PCT/FR2019/051123
§ 371 (c)(1),
(2) Date: Nov. 25, 2020

(87) PCT Pub. No.: WO2019/229322
PCT Pub. Date: Dec. 5, 2019

(65) Prior Publication Data
US 2021/0199018 A1    Jul. 1, 2021

(30) Foreign Application Priority Data
May 28, 2018   (FR) ...................................... 1854491

(51) Int. Cl.
*F01D 11/02*   (2006.01)
*B64D 29/00*   (2006.01)
(Continued)

(52) U.S. Cl.
CPC .............. *F01D 11/02* (2013.01); *B64D 29/00* (2013.01); *F02C 7/28* (2013.01); *F16J 15/447* (2013.01);
(Continued)

(58) Field of Classification Search
CPC ...... F01D 11/00; F01D 11/001; F01D 11/005; F01D 11/02; F01D 25/24; F16J 15/447;
(Continued)

(56) References Cited

U.S. PATENT DOCUMENTS 5,186,609 A    2/1993  Inoue et al.
5,407,319 A *  4/1995  Harrogate ............... F01D 9/023
                                                    415/115
(Continued)

FOREIGN PATENT DOCUMENTS

EP          2246581 A1    11/2010

OTHER PUBLICATIONS

International Search Report dated Nov. 8, 2019, issued in corresponding International Application No. PCT/FR2019/051123, filed May 16, 2019, 5 pages.
(Continued)

*Primary Examiner* — Woody A Lee, Jr.
*Assistant Examiner* — Elton K Wong
(74) *Attorney, Agent, or Firm* — Christensen O'Connor Johnson Kindness PLLC

(57) ABSTRACT

A sealing arrangement is provided between inner and outer coaxial ring-shaped walls of an aircraft engine. The outer wall has an axial end with a U-shaped cross-section parallel to axis, the opening therein being oriented axially in a first direction. The inner wall has an axial end with a U-shaped cross-section parallel to axis, the opening therein being oriented axially in the opposite direction. The U-shaped end of the outer wall includes a ring-shaped free edge axially
(Continued)

engaged in the opening in the axial end of the inner wall. The U-shaped end of the inner wall includes a ring-shaped free edge axially engaged in the opening in the axial end of the outer wall. The walls define therebetween a ring-shaped gas channel having a substantially S-shaped axial cross-section.

9 Claims, 2 Drawing Sheets

(51) Int. Cl.
  *F02C 7/28* (2006.01)
  *F16J 15/447* (2006.01)
(52) U.S. Cl.
  CPC .... *F05D 2220/323* (2013.01); *F05D 2240/55* (2013.01); *F05D 2240/56* (2013.01)
(58) Field of Classification Search
  CPC .... F16J 15/4472; F16J 15/4476; B64D 29/00; F02C 7/28; F05D 2220/323; F05D 2240/55; F05D 2240/56
  See application file for complete search history.

(56) References Cited

U.S. PATENT DOCUMENTS

| 2014/0147271 | A1* | 5/2014 | Burd | F01D 11/005 |
| | | | | 415/230 |
| 2017/0292397 | A1* | 10/2017 | Taniguchi | F01D 25/12 |
| 2021/0010600 | A1* | 1/2021 | McCartney | F16J 15/4472 |

OTHER PUBLICATIONS

Written Opinion of the International Searching Authority dated Nov. 8, 2019, issued in corresponding International Application No. PCT/FR2019/051123, filed May 16, 2019, 6 pages.

Written Opinion dated Nov. 8, 2019, issued in corresponding International Application No. PCT/FR2019/051123, filed May 16, 2019, 8 pages.

International Preliminary Report on Patentability dated Dec. 1, 2020, issued in corresponding International Application No. PCT/FR2019/051123, filed May 16, 2019, 7 pages.

* cited by examiner

SEALING ARRANGEMENT BETWEEN TWO RING-SHAPED WALLS OF AN AIRCRAFT ENGINE

FIELD OF THE INVENTION

The present invention relates to the field of turbomachines for aircrafts. It is aimed more particularly at sealing systems between two cylindrical walls engaged coaxially one inside the other.

PRIOR ART

In particular, in the architecture of turbomachine with a couple of unducted propellers, it is for example necessary to ensure the sealing at the passage between the outer fairing, static, and the platform connected to the blades of each propeller. Sealing must also be ensured between walls connected to the shafts driving these propellers and an inner casing or shell which is either static or rotating at a different speed.

A known solution, generally adopted in turbomachines to ensure a sealing between two rotating elements, is the introduction of labyrinth seals as for example in U.S. Pat. No. 5,186,609 A and EP 2 246 581 A1.

However, for some of the configurations shown in the example, there may be a significant radial displacement between the two walls. Due to manufacturing tolerances and clearances, the labyrinths here can end up with a very open radial clearance to ensure the assembly and a healthy operation. This impairs the efficiency of their main function, which is to ensure the sealing.

The purpose of the invention is to provide a good sealing at a passage between two concentric shells that can rotate relative to each other, taking into account large relative displacements in the radial direction.

PRESENTATION OF THE INVENTION

The invention relates to a sealing arrangement between two annular walls of an aircraft engine, the two walls, respectively radially inner and outer, being coaxially engaged one inside the other around a common axis, characterized in that:
  the outer wall comprises an axial end with a cross-section that has substantially the shape of a U parallel to the axis X, the opening of which is oriented axially in one direction,
  the inner wall comprises an axial end with a cross-section that has substantially the shape of a U parallel to the axis X, the opening of which is oriented axially in an opposite direction,
  the U-shaped end of the outer wall comprising a free annular edge engaged axially in the opening of the axial end of the inner wall, and the U-shaped end of the inner wall comprising a free annular edge engaged axially in the opening of the axial end of the outer wall, so that said walls define between them an annular gas passage with a substantially S-shaped axial cross-section.

The S-shape of the axial section of the annular gas passage allows the installation of seals on at least two of the three branches of the S. Thus, during a significant radial displacement of one wall relative to the other, if one of the two branches opens, reducing the efficiency of the seal installed in it, the other branch closes and it is the seal installed in the latter branch that provides the seal.

In addition, it is possible to absorb large axial displacements, corresponding to the extension of the branches of the U of the wall end sections. Indeed, this configuration makes it possible to create coaxial cylindrical surfaces facing each other with sufficient axial extension to keep seals in contact if these surfaces move axially relative to each other.

Advantageously, labyrinth, brush seal and/or carbon seal sealing means are mounted in said passage.

Said sealing means are mounted in the opening of the axial end of the inner wall and/or in the opening of the axial end of the outer wall.

The sealing means are thus placed on at least two branches of the S-shaped section of the annular passage, which are located inside said opening of one of the wall ends.

Advantageously, labyrinth, brush seal and/or carbon seal sealing means are mounted in said passage between the free annular edge of the U-shaped end of the outer wall and the free annular edge of the U-shaped end of the inner wall.

Similarly, labyrinth, brush seal and/or carbon seal sealing means may be mounted in said passage between the free annular edge of the U-shaped end of one of the walls or of each wall and a surface facing the other wall.

Preferably, brush seal or carbon seal sealing means are mounted between the axial end of the free annular edge of the U-shaped end of one of the walls and the U-shaped opening of the other wall.

Advantageously, in said S-shaped passage, the radial gaps provided, on the one hand, between the two free edges of the U-shaped ends of the walls and, on the other hand, between the free edge of the U-shaped end of each wall and a surface of the other wall are substantially equal.

Advantageously, the axial end of one of the walls is formed in one piece with this wall, and the axial end of the other of the walls is formed by an insert on this wall.

Preferably, the free edge of each U-shaped end is engaged in one of the openings over an axial distance corresponding to approximately 40 to 60% of the axial dimension of that opening.

The invention also relates to an aircraft turbomachine comprising at least one arrangement as described above.

BRIEF DESCRIPTION OF THE FIGURES

The present invention will be better understood and other details, characteristics and advantages of the present invention will appear more clearly on reading the following description, with reference to the annexed drawings on which.

DESCRIPTION OF AN EMBODIMENT OF THE INVENTION

Figure 1:
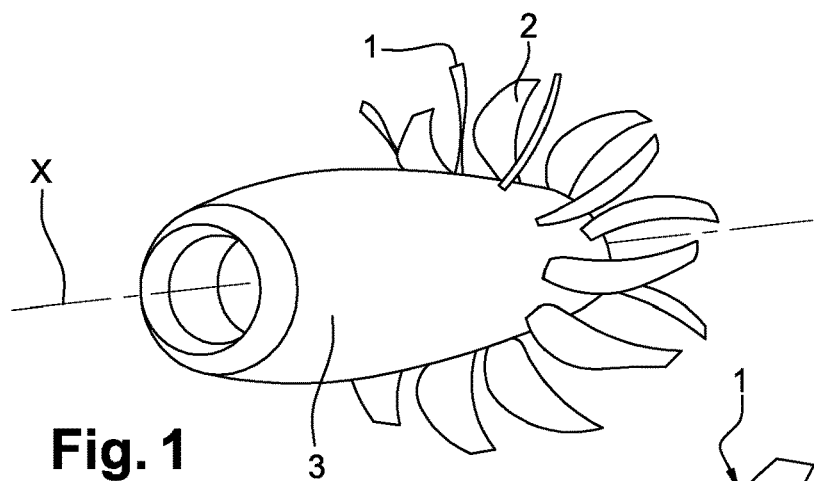
FIG. 1 represents a perspective view of an aircraft engine with two counter-rotating propellers concerned by the invention.
Figure 2:
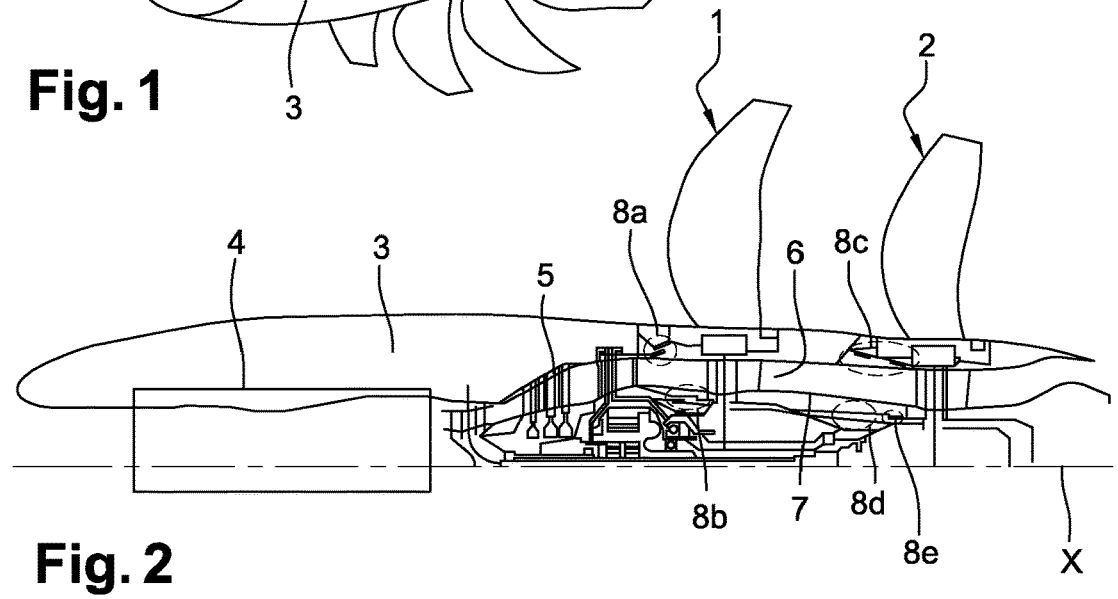
FIG. 2 represents an axial half-section of the engine of FIG. 1 showing areas using an arrangement according to the invention to ensure the sealing between two cylindrical walls engaged coaxially one inside the other.

FIGS. 1 and 2 present an aircraft engine using the invention with a couple of counter-rotating propellers, 1 and 2. The couple of propellers is placed at the rear of the engine and drives the air circulating around a fairing 3 of revolution enveloping the engine. The engine, of turbomachine type, comprises a gas generator 4, not explained but whose place is indicated by a rectangle, which is fed by a central air inlet. The gas generator 4 rotates a power turbine 5 that drives a power turbine 5 that rotates around the engine axis X, via an epicyclic gearbox, the first propeller 1 in one direction and the second propeller 2 in the opposite direction. The annular exhaust gas duct 6 from the turbine passes between the outer fairing 3, at which the roots of the blades of the propellers 1 and 2 are located, and an inner fairing 7, surrounding the rotating shafts of the propellers. As shown in FIG. 2, there is thus for each propeller, 1 and 2, at the passage of each casing, at least one joint, 8a, 8b, 8c, 8d, and 8e, between two substantially cylindrical walls which are in rotation with respect to each other and for which sealing must be ensured. Indeed, on both sides of the walls, at the joint, the gases have different dynamic properties and pressures. Moreover, if we take for example joint 8a of the rotating wall connected at the root of the first propeller 1 with an external fixed fairing element 3, surrounding the exhaust duct 6 at the turbine outlet 5, the thermal expansions of the two parts can be very different since one is in contact with the external ambient air and the other with the hot air leaving the turbine.

Figure 3:
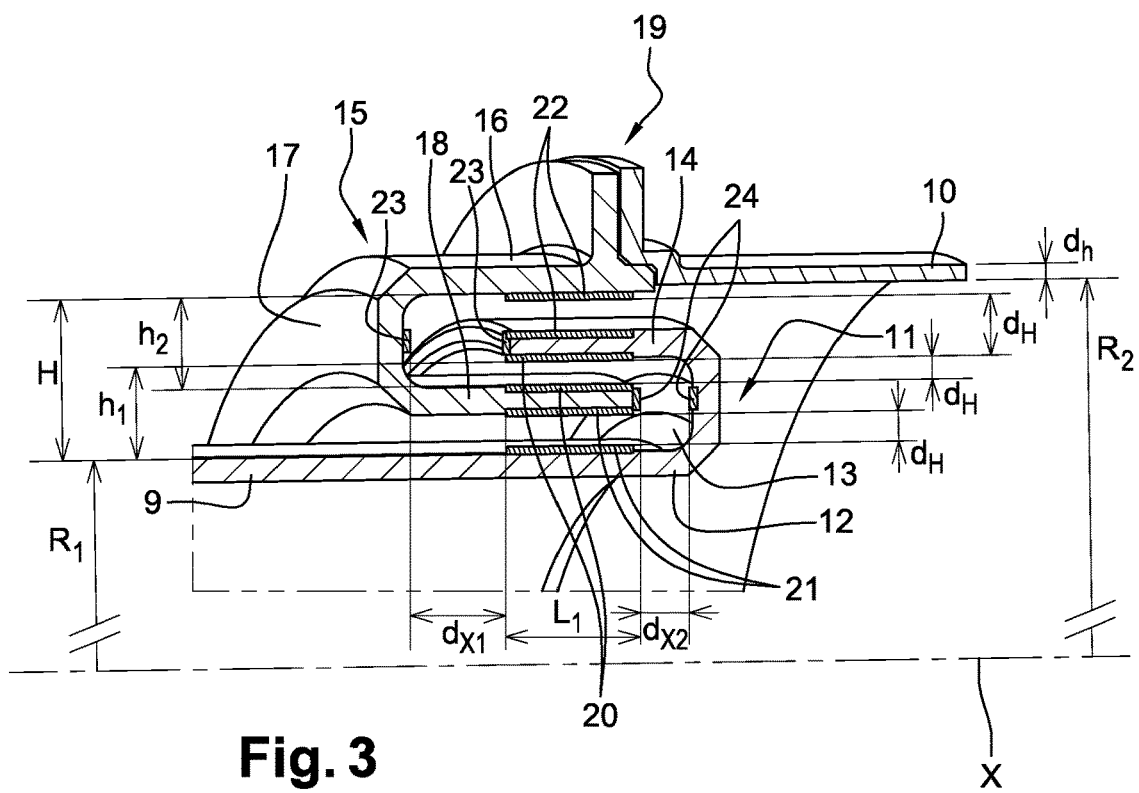
FIG. 3 schematically represents a perspective view represented in an axial plane of a sealing arrangement according to the invention.

FIG. 3 describes an embodiment of a sealing arrangement according to the invention between two annular walls, 9 and 10, nested one inside the other along their common axis X, at a junction such as those described above.

The inner wall 9, coming from the left in the figure, comprises an axial end 11 forming a radially outer return, the axial profile of which has substantially the profile of a U parallel to the axis and open to the left. The axial end 11 thus comprises a first section 12 formed by an element of the inner wall 9 whose cylindrical outer surface of radius R1 is in the extension of the wall 9 on the left. A substantially radial base 13 and a cylindrical free edge 14 whose inner surface is at a radial distance h1 from the outer surface of the inner wall.

Conversely, the outer wall 10, coming from the right in the figure, comprises an axial end 15 forming a radially inner return whose axial profile has substantially a U-shaped profile parallel to the axis and open to the right. This second U thus comprises a first section 16 formed by an external wall element 10 whose internal cylindrical surface of radius R2 is in the extension of the wall on the right. A substantially radial base 17 and a cylindrical free edge 18 whose outer cylindrical surface is at a radial distance h2 from the inner surface of the outer wall.

As shown in FIG. 1, the axial ends, 11 and 15, of the two walls, 9 and 10, interlock with a radial overlap of the free edge 18 of the radial end 15 of the outer wall 10 by the free edge 14 of the axial end 11 of the inner wall 9.

Note here that the axial end 15 of the outer wall 10 is formed by an insert, which is mounted on the main cylindrical body of the outer wall by a flange 19. This is due to assembly considerations. Thus, the insert with its nesting in the axial end 11 of the inner wall 9 can be installed first, and then the main body of the outer wall 10 can be brought in from the right and fixed at its axial end by the flange 19. The insert also allows increased accessibility in case the sealing arrangements need to be repaired/maintained. However, the presence of a flange 19 is an option depending on the configuration of the parts, which can be either rotors or stators, to which the inner and outer walls are attached.

Here, the radial gap between the free edge 18 of the axial end 15 of the outer wall 10 and the free edge 14 of the axial end 11 of the inner wall 9, the radial gap between the free edge 14 of the axial end 11 of the inner wall 9 and the outer wall 10, and the radial gap between the free edge 18 of the axial end 15 of the outer wall 10 and the inner wall 9 all have approximately the same value dH. In addition, the two free edges, 18 and 14, overlap axially for a distance L1, which is significantly greater than the thickness of the walls, 9 and 10.

In addition, an axial gap dx1 is provided between the free edge 14 of the axial end 11 of the inner wall 9 and the base 17 of the axial end 15 of the outer wall 10. Similarly, an axial gap dx2 is provided between the free edge 18 of the axial end 15 of the outer wall 10 and the base 13 of the axial end 11 of the inner wall 9.

In this way, a free annular space with a substantially S-shaped radial cross-section is formed between the axial ends 11 and 15 of the two walls 9 and 10. This free annular space allows the two walls, 9 and 10, to rotate freely relative to each other around the axis X. On the other hand, this free annular space connects an outer cavity through its left axial opening, between the inner wall 9 and the free edge 18 of the axial end 15 of the outer wall 10, and an inner cavity through its right axial opening, between the outer wall 10 and the free edge 14 of the axial end 11 of the inner wall 9.

The arrangement comprises a first seal 20 installed between the faces facing the free edge 14 of the axial end 11 of the inner wall 9 and the free edge 18 of the axial end 15 of the outer wall 10. The elements of this first seal 20 extend substantially over the entire axial extension L1 of the overlap of the two free edges, 18 and 14.

Several options are available to realize this first seal 20. A first option uses an architecture with labyrinth lips on the faces with an abradable material on the part of the opposite surface facing the lips. A second option is the use of a brush seal. A third option is to mount a carbon seal plated on a sealing track by a spring system. The choice of these different options, known to the person skilled in the art, depends on the nature of the two cavities to be separated. Both may contain air, or one may contain oil and the other air, for example.

The arrangement also comprises a second seal 21 that is installed between the faces facing the free edge 18 in the axial end 15 of the outer wall 10 and the section 12 of the inner wall 9 in the axial end 11. This second seal 21 has an axial extension substantially equal to that L1 of the first seal 20. The same options are available for this second seal 21 as for the first seal.

In an embodiment variant, a third seal 22 is installed between the faces facing the free edge 14 of the axial end 11 of the inner wall 9 and the section 12 of the outer wall 10 in the axial end 15. This third seal 22 has an axial extension substantially equal to that L1 of the first seal 20. The same options are available for this third seal 22 as for the previous seals.

In another embodiment variant, only the first 20 and third 22 seals are installed.

Advantageously, the sealing arrangement also comprises a fourth seal 23, between the base 17 of the axial end 15 of the outer wall 10 and the end of the free edge 14 of the axial end 11 of the inner wall 9, as well as a fifth seal 24, between the base 13 of the axial end 11 of the inner wall 9 and the end of the free edge 18 of the axial end 15 of the outer wall 10.

To make these seals, 23 and 24, the option of using a brush seal can be taken. It is also possible to take the option to mount a carbon seal plated on a sealing track by a spring system. These options are to be preferred to a labyrinth because, here, the seal surface is small, limited to the thickness of the wall at the end of the free edge, 14 or 18. As before, the choice of these different options, known to the person skilled in the art, depends on the nature of the two cavities to be separated.

Figure 4:
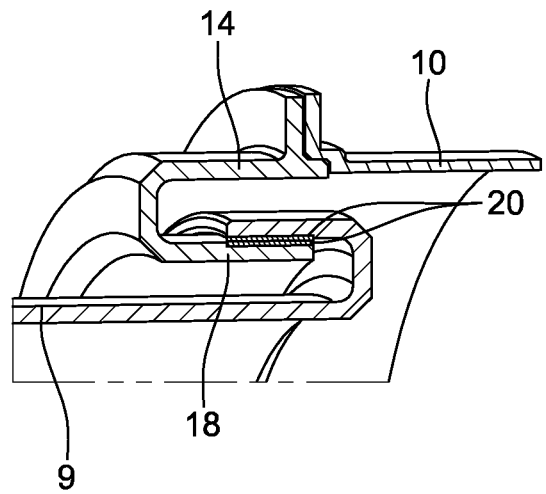
FIGS. 4, 5 and 6 represent a perspective view represented in an axial plane of the positions of the arrangement in FIG. 3 for different radial displacements between the two cylindrical walls.
Figure 5:
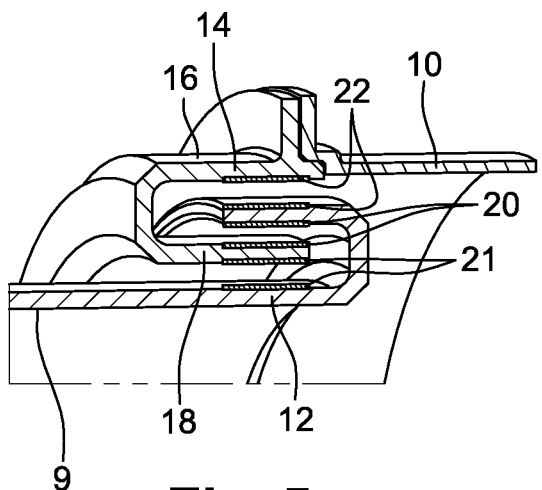
Figure 6:
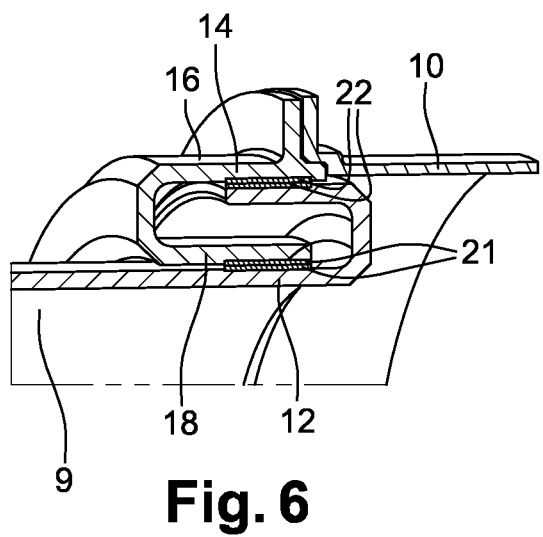

The nested architecture of the arrangement allows, in the case of strong radial displacements, to optimize the leakage rate on an alternation between the activation of the first seal or the second seal. FIGS. 4, 5 and 6 illustrate this property by showing the operation of the arrangement for different variations of the radial gap between the two walls. In this example, the consumption of the clearance is mostly related to the displacement of the inner wall 9.

With reference to FIG. 4, in a cold configuration, where the radius R1 of the inner wall 9 is the smallest, the free edge 14 of the axial end 11 of the inner wall 9 approaches radially the free edge 18 of the axial end 15 of the outer wall 10. The elements of the second seal 21 or the third seal 22, depending on the variant used, may be too open. On the other hand, the first seal 20 provides a sealing because these elements are close together. This first axial seal 20 is said to be optimum in "cold" conditions. With reference to FIG. 5, in a standard configuration, corresponding to the presentation made in FIG. 3, the successive radial clearances between the different nested sections of the axial ends, 11 and 15, of the two walls, 9 and 10, are approximately equal. In the first variant of the embodiment, the first axial seal 20 and the second axial seal 21 are active. In another variant, the third axial seal 22 is also active. Due to the radial gaps between the sections, the individual axial seals are not at their optimum efficiency. However, the nested appearance allows the effect of each seal to be combined in series, which compensates for the mismatch.

With reference to FIG. 6, in a hot configuration, the radius R1 of the inner wall 9 having increased, this results in a small clearance between the free edge 18 of the axial end 15 of the outer wall 19 and the section 12 of the inner wall 9 in the axial end 11, and the same applies to the clearance between the free edge 14 of the axial end 11 of the inner wall 9 and the section 16 of the outer wall 10 in the axial end 15. The first axial seal 20 is not operational because its surfaces are too far apart, but with a small clearance between its surfaces, the second axial seal 21 provides a sealing. It is said to be optimum when "hot". In the variants where it is available, the third axial seal 22 also provides optimum sealing in this case.

In the embodiment variants where they exist, the radial seals, 23 and 24, between the base, 13 or 17, of one axial end, 11 or 15, and the free edge, 18 or 14, of the other axial end, provide an additional sealing which is added in series to that of the axial seals, 20 or 21, in the S-shaped annular passage of the arrangement.

In FIGS. 4 to 6, the two walls, 9 and 10, are in an average axial position relative to each other. A relatively large axial clearance is left between the bases, 13 or 17, and the free edges, 18 or 14, at the axial end to allow relative axial translations without contact. The operation of the radial seals, 23 and 24, is therefore not necessarily optimum, but it is in addition to that of the axial seals, 20 or 21.

If the two annular walls, 9 and 10, move apart axially, then the bases, 13 and 17, move closer to the free edge, 18 and 14, at the other end and the seals, 23 and 24, can provide an additional strong seal. Otherwise, the effectiveness of the radial seals, 23 and 24, diminishes, but, as shown in FIGS. 4 to 6, sealing is provided anyway by the axial seals, 20 and 21.

The invention claimed is:

1. A sealing arrangement between two annular walls of an aircraft engine, the two annular walls comprising an inner wall and an outer wall coaxially positioned around an axis, wherein:
    the outer wall comprises an axial end with a cross-section that has the shape of a U having an axis of symmetry arranged parallel to the axis, the U having an opening oriented axially in a first direction; and
    the inner wall comprises an axial end with a cross-section that has the shape of a U having an axis of symmetry arranged parallel to the axis, the U having an opening oriented axially in a second direction opposite the first direction;
    the U of the axial end of the outer wall comprising a free annular edge engaged axially in the opening of the axial end of the inner wall, and the U of the cross-section of the axial end of the inner wall comprising a free annular edge engaged axially in the opening of the U of the cross-section of the axial end of the outer wall, so that the inner and outer walls define between them an annular gas passage with an S-shaped axial section,
    wherein at least one seal is mounted in said annular gas passage, the at least one seal including at least one of a labyrinth seal, a brush seal, and a carbon seal and
    wherein in the said annular gas passage, radial gaps are provided (i) between the two free annular edges of the walls and (ii) between the free annular edge of each wall and a surface of the other wall, wherein the gaps are equal.

2. The sealing arrangement according to claim 1, wherein said at least one seal is mounted in at least one of the opening of the axial end of the inner wall and the opening of the axial end of the outer wall.

3. The sealing arrangement according to claim 2, wherein the at least one seal is mounted in said annular gas passage between the free annular edge of the U of the cross-section of the axial end of the outer wall and the free annular edge of the U of the axial end of the inner wall.

4. The sealing arrangement according to claim 1, wherein the at least one seal is mounted in said annular gas passage between the free annular edge of the U of the cross-section of the axial end of one of the outer and inner walls or of each inner and outer walls and a surface facing the other wall.

5. The sealing arrangement according to claim 1, wherein the at least one seal comprises one of a brush seal and a carbon seal the at least one seal being mounted between the axial end of the free edge of the U of the cross-section of the axial end of one of the inner and outer walls and the opening of the other of the inner and outer walls.

6. The sealing arrangement according to claim 1, wherein the axial end of one of the inner and outer walls is formed in one piece with the one of the inner and outer walls, and the axial end of the other of the inner and outer walls is formed by an insert on the other of the inner and outer walls.

7. The sealing arrangement according to claim 1, wherein each free annular edge is engaged in one of the openings over an axial distance corresponding to 40% to 60% of the axial dimension of the one of the openings.

8. An aircraft turbomachine comprising at least one arrangement according to claim 1.

9. A sealing arrangement between two annular walls of an aircraft engine, the two annular walls comprising an inner wall and an outer wall coaxially positioned around an axis, wherein:
    the outer wall comprises an axial end with a cross-section that has the shape of a U having an axis of symmetry arranged parallel to the axis, the U having an opening oriented axially in a first direction; and the inner wall comprises an axial end with a cross-section that has the shape of a U having an axis of symmetry arranged parallel to the axis, the U having an opening oriented axially in a second direction opposite the first direction;

the U of the axial end of the outer wall comprising a free annular edge engaged axially in the opening of the axial end of the inner wall, and the U of the cross-section of the axial end of the inner wall comprising a free annular edge engaged axially in the opening of the U of the cross-section of the axial end of the outer wall, so that the inner and outer walls define between them an annular gas passage with an S-shaped axial section, wherein each free annular edge is engaged in one of the openings over an axial distance corresponding to 40% to 60% of the axial dimension of the one of the openings.

\* \* \* \* \*